Figure 1:
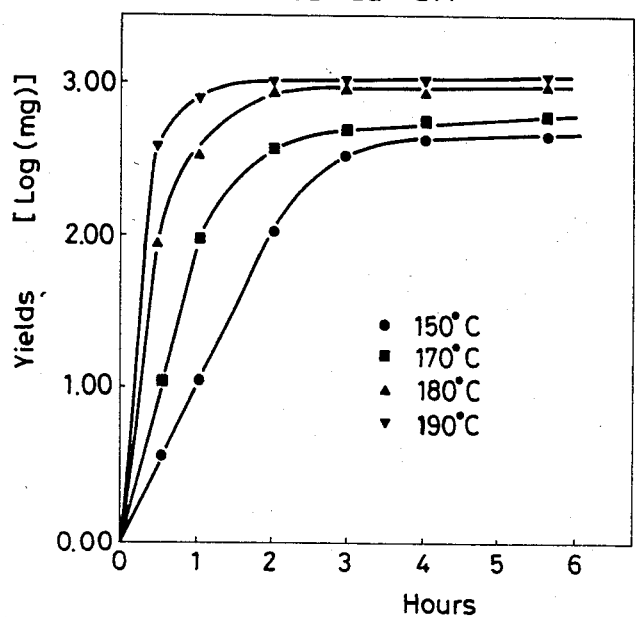

United States Patent [19]
Harada et al.

[11] Patent Number: 4,590,260
[45] Date of Patent: May 20, 1986

[54] METHOD FOR PRODUCING COPOLY(AMINO ACID)

[75] Inventors: Kaoru Harada, 948-2, Azuma 3-chome, Sakura-mura, Niihari-gun, Ibaragi 305; Akira Shimoyama, Niihari, both of Japan

[73] Assignees: Fuso Chemical Co., Ltd., Osaka; Kaoru Harada, Ibaragi, both of Japan

[21] Appl. No.: 709,586

[22] Filed: Mar. 8, 1985

[30] Foreign Application Priority Data

Mar. 28, 1984 [JP] Japan .................................. 59-60160

[51] Int. Cl.$^4$ ............................................. C08G 69/10
[52] U.S. Cl. ...................................... 528/328; 528/310
[58] Field of Search .............................. 528/328, 310

[56] References Cited

U.S. PATENT DOCUMENTS

| 4,283,524 | 8/1981 | Greene | 528/310 |
| 4,459,394 | 7/1984 | Coffey et al. | 528/310 |
| 4,461,885 | 7/1984 | Wo et al. | 528/328 |
| 4,525,576 | 6/1985 | Hayashi et al. | 528/328 |

Primary Examiner—Harold D. Anderson
Attorney, Agent, or Firm—Burgess, Ryan & Wayne

[57] ABSTRACT

Copoly(amino acids) are produced by heating a mixture of at least one amino acid with at least one of ammonium malate, ammonium maleate or ammonium fumarate, or ammonium salts of malic, maleic or fumaric acid monoamide, or malic, maleic or fumaric acid monoamide or diamide, and hydrolyzing the reaction mixture under neutral or alkaline condition. The method is simple and easy to handle, and therefore, it is suitable for industrial applications.

11 Claims, 2 Drawing Figures

MAA : DL-ALa = 2:1

MAA : DL-Val = 3:1

METHOD FOR PRODUCING COPOLY(AMINO ACID)

The preset invention relates to a method for producing copoly(amino acids).

Synthesized copoly(amino acids) are important as the model compounds of protein, i.e. a type of biopolymers, and their industrial application has been noted recently.

A variety of biopolymers are drawing attention as being useful for fixing the cells of useful microorganism or enzyme, as a carrier of fixed medicines, for a gas-permeable membrane, an anti-thrombus agent, special adhesives, a base material of cosmetics, an artificial leather, an ion exchange resin fiber, films and the like.

Among them, copoly(amino acids) are especially useful and exhibit essential features required for such uses.

The following methods are known hitherto in the art for obtaining copoly(amino acids).

(1) A method which has been known for some time wherein amino acids are directly subjected to thermal polycondensation is reported in (Ann. 157 24, (1871), J. C. S. 851 (1953), J. A. C. S. 80 3361 (1958), 80 3361 and 2694, (1958), 82 3754 (1960), (2) A method wherein N-carboxylic anhydrides of amino acids (NCA) are subjected to ring cleavage and condensation under decarboxylation (J. A. C. S. 79 3961 (1957)), J. Polym. Sci., A. 6 2867 (1967), J. Polym. Sci., A. 14 2065 (1976), Japanese Patent Publication Nos. 20793/1967 and 27828/1971), (3) A method wherein reactive esters of amino acids are subjected to polycondensation (Japanese Patent Application Disclosure No. 47799/1979, J. Macromol, Sci. Chem. A. 15 999 (1981), Khim, Prir, Soedin 1973, (4) A method wherein N-dithiocarbonylalkoxycarbonylamino acids are polymerized by heating (Japanese Patent Publication No. 9391/1970), The present invention provides a simple and convenient method for producing copoly(amino acids) having aspartic acid residues as a component of the copolymer.

The present invention is directed to a method for producing copoly(amino acids) which comprises admixing at least one species of amino acids with at least one compound selected from the group consisting of an ammonium salt of malic, maleic or fumaric acid, or that of the monoamide thereof; or malic, maleic or fumaric acid monoamide for diamide: subjecting the mixture to thermal polycondensation, and then hydrolysis.

The polycondensation reaction is carried out desirably in a nitrogen atmosphere at 100°–225° C., preferably at 160°–200° C., for several minutes to several hours, preferably 30 minutes to 5 hours. The reaction may be carried out under normal atmospheric pressure. If water formed by the condensation is discharged from the reaction mixture through the reaction, however, it may be carried out under reduced pressure in order to discharge the water more effectively.

The water may be distilled off from the reaction mixture by azeotropic distillation. The polycondensation reaction proceeds well without a catalyst; however, a catalyst such as pyrosulfuric acid, a phosphonate, a phosphite, phosphoric acid, a sulphonic acid, a quaternary ammonium salt and the like may be used in the presence or absence of a solvent, as long as it does not hinder the reaction basically.

The amino acid referred to herein, in consideration of the features of the present invention, may be a series of α-amino acids, β-amino acids, unsaturated amino acids, or other amino acid containing protein. Namely, there may be exemplified a neutral amino acid such as glycine, alanine, phenylalanine, leucine, isoleucine, valine, methionine, cystine, cysteine, serine, threonine and the like; an acidic amino acid such as glutamic acid, α-aminoadipic acid, aminomalonic acid, α-aminopimelic acid, α-aminosebacic acid, β-methylglutamic acid, β,β-di-methylaspartic acid and the like; a basic amino acid such as ornithine, lysine, arginine, histidine etc.; a β-amino acid such as β-alanine, β-phenylalanine, β-aminobutyric acid, α-methyl-β-aminopropionic acid, isoserine, β-tyrosine, taurine and the like; and an unsaturated amino acid such as α-aminoacrylic acid or α-aminocrotonic acid. If there is an optical isomer with an amino acid, it may be employed as a DL-isomer, L-isomer or D-isomer. The isomers may be selected and employed in accordance with the use of the copoly(amino acids).

By hydrolyzing the present polycondensation products, preferably under neutral or alkaline conditions, copoly(amino acids) (peptide type) are easily produced.

In the reaction of the present invention, monoammonium or diammonium salt, or ammonium salt of monoamide, or monoamide or diamide of malic acid and/or

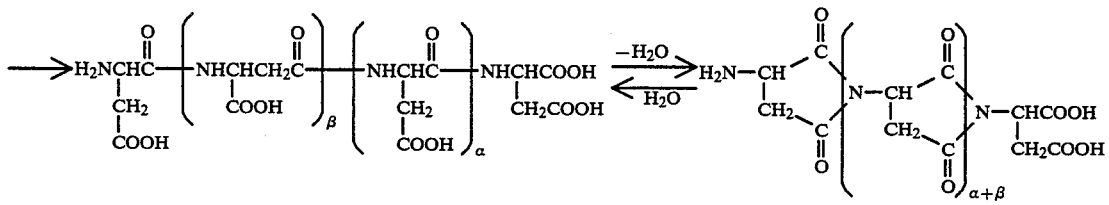

maleic acid and/or fumaric acid are employed as the reactants. It seems that the reactant dissolves each species of the amino acids and initiates a homogeneous reaction.

Figure 2:
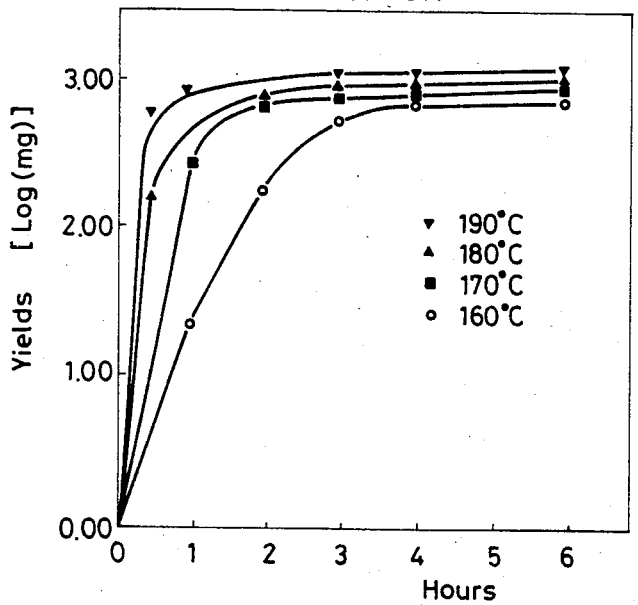

In the drawings,

FIG. 1 and FIG. 2 show the relation between hours for heating the mixtures of ammonium malate (MAA) with amino acids in each temperature and the yield of copoly(amino acids).

According to present invention, copoly(amino acids) wherein any species of amino acids is incorporated is easily produced by employing inexpensive, easily available reactants and simple reaction procedures. Such poly(amino acids) have been thought to be difficult to synthesize. Therefore, the present invention is far superior than conventional methods of producing copoly(amino acids).

The ratio of the copoly(amino acids) incorporated in the product varies depending on the species of amino acids, for instance, glycine is incorporated exceeding its ratio in the reaction mixture.

The present invention is exemplified in the following examples; however, the present invention is not limited to the examples.

EXAMPLE I

Monoammonium malate was mixed with one of amino acids [DL-glycine (Gly), DL-alanine (Ala, DL-valine (Val), DL-phenyl-alanine (Phe)] in various mol ratios, and each mixture was subjected to thermal polycondensation in a test tube in nitrogen atmosphere at a temperature from 160° C. to 190° C.

After cooling the reaction mixture, distilled water was added to suspend or dissolve the mixture, and the suspension or solution was dialyzed by the use of a semipermeable cellophane membrane for 24 hours, followed by freeze-drying to obtain the polymer. The yields are shown in Table 1, FIG. 1 and FIG. 2. The yields in the table and the drawings were calculated in accordance with the following formula; Yield (wt. %)=(Weight of polymer obtained/Total weight of reactants)×100.

The polymers thus obtained were negative in ninhydrine tests and positive in biuret tests. In infrared adsorption spectra, adsorptions were observed at around 1700 $cm^{-1}$ indicating a 5-membered cyclic imide structure, and around 1650 $cm^{-1}$ (amide I) and around 1550 $cm^{-1}$ (amide II) indicating the peptide combination of amino acids incorporated into the polymer.

These polymers were hydrolyzed with aqueous sodium bicarbonate solution. The reaction mixture was acidified weakly by adding 10% acetic acid and then dialyzed. The products thus obtained show adsorptions at around 1650 $cm^{-1}$ (amide I), around 1550 $cm^{-1}$ (amide II), and an adsorption by carboxyl group at around 1700 $cm^{-1}$.

From the foregoing, it is apparent that the polymers obtained by thermal polycondensation are copoly(amino acids) having peptide combinations wherein anhydroaspartic acid is one of the constitutive components, and the polymers obtained through hydrolysis by sodium bicarbonate are copoly(amino acids) having carboxyl groups (copolypeptide type of polymer having aspartic acid residue).

Each of the copolymers obtained by thermal polycondensation and subsequent dialysis, was hydrolyzed in a sealed vacuum tube with 6N hydrochloric acid at 108° C. for 24 hours and the hydrolysate was analyzed with an amino acid autoanalyzer to determine amino acid ratio (mol%) in the copolymers. The results are shown in Tables 2 and 3.

The molecular weight of each polymer was determined gel-filtration method. Employing GPC column [Nihon Bunkou JASCO Finepak SIL AF102, 7.2(I.D. X 500 (L)] and authentic samples of molecular weight (Bovine Serum albumin: M.W. 66,300, Ovalbumin: M.W. 43,000, Cytochrome C: M.W. 6,000), the calibration curve of molecular weight was prepared. In result, the molecular weights of copoly(amino acids) obtained by the polymerization were determined to be about 10,000.

TABLE 1

The yield (wt. %) of copoly(amino acids) obtained from the reaction mixture (180° C., 4 hrs) of monoammonium malate (MMA) and amino acid (A.A.)

| Molar ratio MAA:A.A. | Yield (wt %) | | | | | | |
|---|---|---|---|---|---|---|---|
| | Gly | Ala | Val | Leu | Glu | His | Phe |
| 3:1 | 42.6 | 45.1 | 44.5 | 54.3 | | 25.5 | 57.6 |
| 2:1 | 30.1 | 34.7 | 43.9 | 57.2 | 40.7 | | |
| 1:1 | 27.8 | 28.3 | 40.7 | | 27.9 | | |
| 1:2 | 17.0 | | 12.7 | | 17.4 | | |
| 1:3 | | | | | 8.0 | | |

Heating hours of the mixture of monoammonium malate (MAA) with an amino acid at various temperatures, and the yield of copoly(amino acids) thus obtained are shown in FIG. 1 and FIG. 2.

TABLE 2

Amino acid composition obtained by heating at various temperatures for 4 hours (MAA:A.A = 2:1)

| Mixture of MAA and Glycine | | | |
|---|---|---|---|
| Temp. (°C.) | Dl-Asp(mol %) | Gly(mol %) | Gly/DL-Asp |
| 160 | 64.0 | 36.0 | 0.56 |
| 170 | 58.4 | 41.6 | 0.71 |
| 180 | 56.4 | 43.6 | 0.77 |
| 190 | 53.7 | 46.3 | 0.86 |

| Mixture of MAA and Alanine | | | |
|---|---|---|---|
| Temp. (°C.) | DL-Asp(mol %) | DL-Ala(mol %) | DL-Ala/DL-Asp |
| 160 | 75.8 | 24.2 | 0.31 |
| 170 | 69.6 | 30.4 | 0.43 |
| 180 | 67.3 | 32.7 | 0.49 |
| 190 | 62.8 | 37.2 | 0.59 |

| Mixture of MAA and Valine | | | |
|---|---|---|---|
| Temp. (°C.) | DL-Asp(mol %) | DL-Val(mol %) | DL-Val/DL-Asp |
| 160 | 71.0 | 29.0 | 0.41 |
| 170 | 68.0 | 32.0 | 0.47 |
| 180 | 65.6 | 34.0 | 0.52 |
| 190 | 64.8 | 35.2 | 0.54 |

TABLE 3

Amino acid compositions of copoly(amino acids) obtained from various mixing ratios of amino acids (180° C., 4 hours)

| Mixture of MAA and Gly | | | |
|---|---|---|---|
| MAA:Gly | DL-Asp (mol %) | | |
| 3:1 | 75.9 | 24.1 | 0.32 |
| 2:1 | 56.4 | 43.6 | 0.77 |
| 1:1 | 39.2 | 60.8 | 1.55 |
| 1:2 | 17.8 | 82.3 | 4.63 |

| Mixture of MAA and Alanine | | | |
|---|---|---|---|
| MAA:Ala | DL-Asp (mol %) | DL-Ala(mol %) | DL-Ala/DL-Asp |
| 3:1 | 74.6 | 25.4 | 0.34 |
| 2:1 | 67.3 | 32.4 | 0.45 |
| 1:1 | 47.1 | 52.9 | 1.12 |
| 1:2 | 29.8 | 70.0 | 2.36 |

| Mixture of MAA and Valine | | | |
|---|---|---|---|
| MAA:Val | DL-Asp (mol %) | DL-Val(mol %) | DL-Val/DL-Asp |
| 3:1 | 74.4 | 25.6 | 0.34 |
| 2:1 | 65.6 | 34.4 | 0.52 |
| 1:1 | 49.3 | 50.7 | 1.03 |
| 1:2 | 30.6 | 69.4 | 2.27 |

| Mixture of MAA and Glutamic acid | | | |
|---|---|---|---|
| MAA:Glu | DL-Asp (mol %) | DL-Glu(mol %) | DL-Glu/DL-Asp |

TABLE 3-continued

Amino acid compositions of copoly(amino acids) obtained from various mixing ratios of amino acids (180° C., 4 hours)

| | | | |
|---|---|---|---|
| 3:1 | 88.3 | 11.7 | 0.13 |
| 2:1 | 84.8 | 15.2 | 0.18 |
| 1:1 | 78.6 | 21.4 | 0.27 |
| 1:2 | 63.7 | 36.3 | 0.57 |
| 1:3 | 62.8 | 37.2 | 0.60 |

EXAMPLE 2

Monoammonium malate was mixed with three species of amino acids (glycine, alanine and valine) in various ratios, and each mixture was treated as in Example 1. The amino acid compositions of copoly(amino acids) thus otained are shown in Table 4.

As seen from the Table, glycine and alanine are incorporated in the products beyond the ratio of these amino acids in the reactants.

TABLE 4

Amino acid compositions of copoly(amino acids) obtained by thermal polycondensation of mixtures of MAA, Gly, Ala and Val (180° C.)

| | Mol % (A.A./Asp) | | |
|---|---|---|---|
| | Heating time | | |
| | 2 h | 4 h | 6 h |
| ASp | 16.4 (1.00) | 17.5 (1.00) | 16.7 (1.00) |
| Gly | 46.9 (2.95) | 41.2 (2.35) | 42.2 (2.52) |
| Ala | 23.5 (1.43) | 25.4 (1.45) | 25.5 (1.58) |
| Val | 13.2 (0.30) | 15.9 (0.91) | 14.5 (0.37) |
| MAA:Gly:Ala:Val = 1:1:1:1 Heated at 180° C. | | | |
| Asp | 36.2 (1.00) | 36.3 (1.00) | 36.1 (1.00) |
| Gly | 29.4 (0.81) | 29.9 (0.80) | 27.7 (0.77) |
| Ala | 20.9 (0.53) | 20.9 (0.53) | 20.1 (0.56) |
| Val | 13.4 (0.38) | 14.0 (0.38) | 16.1 (0.45) |
| MAA:Gly:Ala:Val = 2:1:1:1 Heated at 180° C. | | | |

EXAMPLE 3

Monoammonium malate was mixed with β-alanine (β-Ala) or γ-aminobutyric acid (GABA) in various molar ratios and subjected to the same treatment as in Example 1. The yields and amino acid compositions of copoly(amino acids) thus obtained are shown in the following tables:

TABLE 5

Yields of copoly(amino acids) from mixture of monoammonium malate (MAA) and β-alanine (β-Ala) or γ-aminobutyric acid (GABA) (180° C.)

| MAA:A.A. | β-Ala (wt %) | GABA (wt %) |
|---|---|---|
| 3:1 | 43.3 | 38.6 |
| 2:1 | 39.8 | 33.3 |
| 1:1 | 12.3 | 16.0 |
| 1:2 | 3.2 | 6.2 |
| 1:3 | 4.0 | 1.5 |

TABLE 6

Amino acid compositions of copoly(amino acids) from mixture of monoammonium malate (MAA) and β-alanine (β-Ala) (180° C. 4 h)

| MAA:-Ala | Asp (mol %) | -ala (mol %) | -Ala/Asp |
|---|---|---|---|
| 3:1 | 82.6 | 17.4 | 0.21 |
| 2:1 | 73.8 | 26.2 | 0.36 |
| 1:1 | 57.2 | 42.8 | 0.75 |
| 1:2 | 34.2 | 65.8 | 1.92 |

TABLE 6-continued

Amino acid compositions of copoly(amino acids) from mixture of monoammonium malate (MAA) and β-alanine (β-Ala) (180° C. 4 h)

| MAA:-Ala | Asp (mol %) | -ala (mol %) | -Ala/Asp |
|---|---|---|---|
| 1:3 | 23.1 | 76.9 | 3.33 |

TABLE 7

Amino acid compositions of copoly(amino acids) from mixture of monoammonium malate (MAA) and γ-aminobutyric acid (GABA) (180° C.)

| MAA:GABA | Asp (mol %) | GABA (mol %) | GABA/Asp |
|---|---|---|---|
| 3:1 | 82.5 | 17.5 | 0.21 |
| 2:1 | 75.2 | 24.8 | 0.33 |
| 1:1 | 67.4 | 32.6 | 0.48 |
| 1:2 | 55.3 | 44.7 | 0.81 |
| 1:3 | 38.1 | 61.9 | 1.62 |

EXAMPLE 4

The same procedures as in Example 1 were carried out except that monoammonium maleate was used instead of monoammonium malate. The resulting copoly(amino acids) showed the following yields and amino acid compositions:

TABLE 8

Yields and amino acid compositions of copoy(amino acids) from mixture of monoammonium maleate (MAM) and various amino acids (180° C. 4 h, MAM:A.A. = 2:1)

| A.A. | Yield (wt %) | Asp (mol %) | A.A. (mol %) | A.A./Asp |
|---|---|---|---|---|
| Gly | 29.0 | 66.7 | 33.3 | 0.50 |
| Ala | 38.6 | 69.4 | 30.6 | 0.44 |
| Val | 36.0 | 59.0 | 41.0 | 0.69 |
| Phe | 79.2 | 61.8 | 38.2 | 0.62 |
| Glu | 39.5 | 82.7 | 17.3 | 0.21 |
| Lys | 59.1 | 67.2 | 32.8 | 0.49 |

EXAMPLE 5

The same procedures as in Example 1 were carried out except that ammonium maleamate 9AMA) or monoammonium fumarate 9MAF) was used instead of monoammonium malate. The resulting copoly(amino acids) showed the following yields and amino acid compositions.

TABLE 9

Yields and amino acid compositions of copoy(amino acids) from ammonium maleamate (AMA) or monoammonium fumarate (MAF) and various amino acids (AMA:A.A. = 2:1, 180° C. 4 h; MAF:A.A. = 1:1, 200° C. 4 h)

| MAM or MAF | A.A. | Yield (wt %) | Asp (mol %) | A.A. (mol %) | A.A./Asp |
|---|---|---|---|---|---|
| AMA | Gly | 6.1 | 65.6 | 34.3 | 0.52 |
| AMA | Ala | 2.4 | 80.8 | 19.2 | 0.24 |
| AMA | Val | 3.2 | 87.1 | 12.9 | 0.15 |
| MAF | Gly | 3.0 | 40.4 | 59.6 | 1.47 |

We claim:

1. A method for producing copoly(amino acid) which comprises admixing at least one amino acid with at least one compound selected from the group consisting of an ammonium salt of malic, maleic or fumaric acid; an ammonium salt of malic, maleic or fumaric acid monoamide; or malic, maleic or fumaric acid monoamide or diamide; subjecting the mixture to thermal polycondensation, hydrolyzing the product of said polycondensation, and recovering said copoly(amino acid).

2. A method according to claim 1 wherein the amino acid is selected from the group consisting of α-amino acids, β-amino acids, and ethytenically unsaturated amino acids.

3. A method according to claim 1 wherein the amino acid is selected from the group consisting of glycine, alanine, valine, leucine, glutamic acid, histidine or phenylalanine.

4. A method according to claim 1 wherein the ammonium salt is selected from the group consisting of monoammonium or diammonium malate, maleate or fumarate, or ammonium salt of malic, maleic or fumaric acid monoamide.

5. A method according to claim 1 wherein the polycondensation is carried out at a temperature between about 100°–225° C., and the hydrolysis is carried out under neutral or alkaline conditions.

6. The method according to claim 1 wherein the polycondensation is carried out at a temperature between about 160°–200° C., and the hydrolysis is carried out under neutral or alkaline conditions.

7. In the method of producing copoly(amino acid), a process which comprises admixing at least one amino acid with at least one compound selected from the group consisting of an ammonium salt of malic, maleic, or fumaric acid; an ammonium salt of malic, maleic or fumaric acid monoamide; or malic, maleic or fumaric acid monoamide or diamide; heating the mixture at a temperature between about 100°–225° C., and hydrolyzing the reaction mixture under neutral or alkaline condition.

8. The method of claim 7 wherein said mixture is heated at a temperature between about 160°–200° C.

9. A process according to claim 7 wherein the amino acid is selected from the group consisting of an α-amino acid, a β-amino acid, and ethytenically unsaturated amino acid.

10. A process according to claim 7 wherein the amino acid is selected from the group consisting of glycine, alanine, valine, leucine, glutamic acid, histidine or phenylalanine.

11. A process according to claim 7 wherein the ammonium salt is selected from the group consisting of monoammonium or diammonium malate, maleate or fumarate; or ammonium salt of malic, maleic or fumaric acid monoamide.

* * * * *